(12) United States Patent
Skovby et al.

(10) Patent No.: US 9,802,861 B2
(45) Date of Patent: *Oct. 31, 2017

(54) PROCESS FOR THE PREPARATION OF CEMENT, MORTARS, CONCRETE COMPOSITIONS CONTAINING A CALCIUM CARBONATE-BASED FILLER TREATED WITH AN ULTRAFINE FILLER AND A SUPERPLASTIFIER, COMPOSITIONS AND CEMENT PRODUCTS OBTAINED AND THEIR APPLICATIONS

(71) Applicant: Omya International AG, Oftringen (CH)

(72) Inventors: Michael Skovby, Meilen (CH); Pascal Gonnon, Villeneuve (FR)

(73) Assignee: Omya International AG, Oftringen (CH)

( * ) Notice: Subject to any disclaimer, the term of this patent is extended or adjusted under 35 U.S.C. 154(b) by 31 days.

This patent is subject to a terminal disclaimer.

(21) Appl. No.: 14/373,491

(22) PCT Filed: Feb. 27, 2013

(86) PCT No.: PCT/IB2013/000338
§ 371 (c)(1),
(2) Date: Jul. 21, 2014

(87) PCT Pub. No.: WO2013/128270
PCT Pub. Date: Sep. 6, 2013

(65) Prior Publication Data
US 2015/0101513 A1    Apr. 16, 2015

Related U.S. Application Data

(60) Provisional application No. 61/620,489, filed on Apr. 5, 2012.

(30) Foreign Application Priority Data

Feb. 28, 2012  (EP) .................................... 12001321

(51) Int. Cl.
| | | |
|---|---|---|
| *C04B 14/28* | (2006.01) |
| *C04B 28/02* | (2006.01) |
| *C04B 40/00* | (2006.01) |
| *C04B 14/04* | (2006.01) |
| *C04B 14/10* | (2006.01) |
| *C04B 24/04* | (2006.01) |
| *C04B 24/02* | (2006.01) |
| *C04B 24/22* | (2006.01) |

(52) U.S. Cl.
CPC .............. *C04B 14/28* (2013.01); *C04B 14/04* (2013.01); *C04B 14/106* (2013.01); *C04B 14/285* (2013.01); *C04B 24/023* (2013.01); *C04B 24/045* (2013.01); *C04B 24/22* (2013.01); *C04B 24/223* (2013.01); *C04B 28/02* (2013.01); *C04B 40/0039* (2013.01); *Y02W 30/94* (2015.05)

(58) Field of Classification Search
CPC ... C04B 20/0096; C04B 20/008; C04B 28/02; C04B 24/223; C04B 24/023; C04B 24/22; C04B 24/045; C04B 24/226; C04B 24/2647; C04B 24/2641; C04B 40/0039; C04B 40/0028; C04B 14/28; C04B 14/106; C04B 14/04; C04B 14/285; C04B 14/26; C04B 18/146; C04B 2103/30; C04B 2103/32
USPC ....................................................... 106/816
See application file for complete search history.

(56) References Cited

U.S. PATENT DOCUMENTS

| | | |
|---|---|---|
| 4,518,725 A | 5/1985 | Guicquero |
| 5,739,212 A | 4/1998 | Wutz et al. |
| 5,879,445 A | 3/1999 | Guicquero et al. |

(Continued)

FOREIGN PATENT DOCUMENTS

| | | | | |
|---|---|---|---|---|
| EP | 0099954 A1 | 2/1984 | | |
| EP | 1655272 A1 * | 5/2006 | ......... | C04B 24/2647 |

(Continued)

OTHER PUBLICATIONS

U.S. Department of Transportation, Federal Highway Administration. "Superplasticizers". http://www.fhwa.dot.gov/infrastructure/materialsgrp/suprplz.htm.*
"Chryso Fluid Premia 180". Chryso. Feb. 2008. Retrieved from http://chryso-india.cn/upload/t_documents/Fichier_L2/42910/FT_CHRYSOFluid_Premia_180_GB.pdf.*
Search Report dated Sep. 5, 2012 for European Application No. 12001321.4.
Written Opinion dated Aug. 26, 2013 for PCT Application No. PCT/IB2013/000338.
International Search Report dated Aug. 26, 2013 for PCT Application No. PCT/IB2013/000338.

*Primary Examiner* — Anthony J Green
(74) *Attorney, Agent, or Firm* — Amster, Rothstein & Ebenstein LLP (57) ABSTRACT

Process for the preparation of cement/mortar/concrete compositions or systems, (for simplicity hereafter "cement" compositions or systems or even "cements"), of a generally known type containing low or medium (standard) "filler(s)", and/or optionally HP filler(s), as carbonate-based filler(s), namely coarse low or medium calcium carbonate(s), namely coarse marble(s); Product comprising, or consisting of, the pre-blend (A) of coarse, low or medium (or optionally HP) "calcium carbonate-based filler" pre-blended with at least an UF; Aqueous compositions (B) obtained by mixing the above pre-blend (A) of coarse filler(s) with UF(s) with an aqueous system such as mix water, aqueous mix fluid; Product (C) consisting of, or comprising, the pre-blend (A) or the compositions (B), treated or pretreated with at least one superplastifier or aqueous system containing superplastifier(s); Cement and Use of cement.

25 Claims, 1 Drawing Sheet

(56) References Cited

U.S. PATENT DOCUMENTS

| | | |
|---|---|---|
| 2002/0081261 A1 | 6/2002 | Carrette et al. |
| 2002/0096727 A1 | 7/2002 | Fischer et al. |
| 2006/0009560 A1 | 1/2006 | Gane et al. |
| 2007/0266906 A1* | 11/2007 | Garcia ............... C04B 22/0026 106/817 |
| 2007/0299182 A1 | 12/2007 | Gane et al. |
| 2009/0090278 A1* | 4/2009 | Virtanen ............... B82Y 30/00 106/738 |
| 2009/0145987 A1 | 6/2009 | Gane et al. |
| 2009/0326101 A1 | 12/2009 | Suau et al. |
| 2011/0319526 A1 | 12/2011 | Suau et al. |
| 2012/0012034 A1* | 1/2012 | Guynn ............... B02C 21/00 106/709 |
| 2012/0227634 A1 | 9/2012 | Suau et al. |

FOREIGN PATENT DOCUMENTS

| | | |
|---|---|---|
| EP | 2142869 A1 | 1/2010 |
| FR | 2815629 | 10/2000 |
| FR | 2818627 A1 | 6/2002 |
| FR | 2818629 A1 | 6/2002 |
| WO | 9408913 A1 | 4/1994 |
| WO | 2004041882 A1 | 5/2004 |
| WO | 2007057510 A1 | 5/2007 |
| WO | 2007132098 A1 | 11/2007 |
| WO | 2008107790 A1 | 9/2008 |
| WO | WO 2010007534 A2 * | 1/2010 |
| WO | 2010109095 A1 | 9/2010 |
| WO | WO 2011026825 A2 * | 3/2011 |

* cited by examiner

PROCESS FOR THE PREPARATION OF CEMENT, MORTARS, CONCRETE COMPOSITIONS CONTAINING A CALCIUM CARBONATE-BASED FILLER TREATED WITH AN ULTRAFINE FILLER AND A SUPERPLASTIFIER, COMPOSITIONS AND CEMENT PRODUCTS OBTAINED AND THEIR APPLICATIONS

CROSS-REFERENCE TO RELATED APPLICATIONS

This application is a U.S. national phase of PCT Application No. PCT/IB2013/000338, filed Feb. 27, 2013, which claims priority to European Application No. 12 001 321.4, filed Feb. 28, 2012 and U.S. Provisional Application No. 61/620,489, filed Apr. 5, 2012.

TECHNICAL FIELD OF THE INVENTION

The present invention relates to the field of cement compositions, cementitious compositions, hydraulic binders compositions, mortar compositions, concrete "compositions" (or hereafter equivalently "systems"), namely of the type compositions (or "systems") of cement/hydraulic binders, mortars, concrete, containing at least one particulate mineral of the calcium carbonate(s) type as a filler, and their applications, as well as the corresponding cement, mortar, concrete products or elements, the said filler being a filler "upgraded" according to the invention from a "standard" level to a "technical" or "high performance" ("HP") level of performance due to a process which is the essential part of the invention.

The invention relates to a specific process for producing the said "compositions" or "systems" (those terms are going to be used as equivalents in this application and claims) for cement, hydraulic binder, mortar, concrete, the obtained compositions, the cement, mortars and concrete products obtained therefrom, and their applications.

PRIOR ART

It is reminded that a cement "system" (or equivalently "composition") is a system comprising cement particles, mixing water (or equivalently a mixing aqueous composition not interfering with the said system, as known to the skilled man), filler(s), various optional and usual additives such as air entrainment agents, setting retarders, setting accelerators and the like, and any such routine additives as well known to the skilled man.

A mortar system additionally contains an inert aggregate material, usually a sand.

A concrete system still additionally contains gravel.

The above is abundantly known and common knowledge.

Definition: cement systems or compositions or slurries: As a matter of simplicity, and also because the invention relates to the use of additives adapted to improve or "upgrade" the properties of any of, those three systems, the terms "cement systems" (or "compositions") (or "slurries") (or "cements") will be used in the following to encompass ANY of the above main kinds of compositions or "systems" and their technical equivalents, that is a cement, cementitious, hydraulic binder, mortar or concrete composition or system. The skilled man will be able to appreciate if the system is a cement, a mortar or a concrete composition in view of the presence, or the absence, of sand and/or gravel.

This simplification is made possible since sand and gravel are inert materials, and therefore do not noticeably interfere with the invention.

"Technical equivalent" means that the composition may contain "inert" components or components having about the same function and producing about the same results: for example, a pure cement can be replaced with a cement containing cement additives, or a cementitious composition behaving like a cement brand, and so forth. That definition is widely known and understood.

It is also pointed out that, even if, in the following, an information is provided regarding "cement systems (or compositions)" (or even "cement" for simplicity) for example, it ALSO applies mutatis mutandis to any of the above other kinds of systems (mortars, etc. . . . ). The only difference between the systems being mainly the presence, or not, of sand and/or gravel.

In such compositions, "bottom-tank" fluidifier(s) is/are often used.

In that domain, the EP 0 663 892 to CHRYSO is certainly the most relevant document, which discloses fluidifier polymers for mineral suspensions with no hydraulic setting, or hydraulic binders slurries.

Cited applications are paper coating, paints, and synthetic resins or rubber compositions.

According to the said prior art, it was known to add fluidifiers in mineral, particular suspensions to lower their viscosity, and, especially for paper applications, this leads to high mineral concentrations, a better workability, and this reduces the drying energy. For example, this is used in connection with suspensions of calcium carbonate.

It is also known to add such fluidifiers to "cement" (in the wide sense explained hereabove) slurries, with the purpose this time of reducing their water content and to obtain a "cement" composition with a "more dense structure" after setting.

Encountered problems are: the influence of electrolytes, which reduces the fluidifying effect and forces to increase the amount of fluidifier (with an increase in cost), as well as, for "cement", the need not to negatively alter the setting characteristics of the cement composition not its final properties.

Some well-known fluidifiers are superplastifiers or plastifiers.

In that domain, the EP 0 663 892 to CHRYSO is relevant, as well as FR 2 815 627, FR 2 815 629 and WO2008/107790 which also disclose interesting superplastifiers.

Some known fluidifiers affect less the setting time, but are still unsatisfactory, such as condensation products of sulfonated naphtalene and formaldehyde or melamine-formaldehyde with a sulfonated compound. Some of those products are also superplastifiers, but much less preferred.

Also, EP 0 099 954 relates to fluidifiers made by condensation of amino-sulfonic acid comprising at least an aromatic ring with nitrogenated compounds bearing several amine functions and formaldehyde.

Such are said not to delay too much the setting of cement compositions, but they are highly sensitive to electrolytes when it comes to their "activity". They also can be obtained with low concentrations, usually no more than about 40% by dry weight, since any concentration increase in turn increases their viscosity to inadmissible levels.

The summary of the desired properties is listed page 3 lines 15 ff of the above-mentioned EP.

It is also known to add filler(s) in cement, hydraulic binders, cementitious or concrete or mortars compositions or "systems".

The purpose of adding such filler(s) is to fill the voids between particles, to reduce the overall costs, to greatly improve a property called "consistency" (consistency being the capacity or ability for the considered systems to easily flow or "self-level", or not) and to improve a property called "compacity" (that is the percentage of dry material in the final composition (the higher the percentage, the better the compacity)).

Finally, EP 10 008 803.8 describes the treatment of calcium carbonate based filler(s) (see definition herebelow) with certain superplastifiers optionally admixed with certain plasticizers and optionally fluidifiers in order to upgrade "low" or "dry" grade (or "standard") "cement systems" (not usable in the modern industry as explained in detail in the said application and herebelow for completeness) to at least "plastic" and most preferably "fluid" "cement systems" which can be used with great advantages in the modern industry.

In the above considered prior EPA, a true "treatment" is performed", leading to a definite and surprising technical effect.

Definition: calcium carbonate-based filler(s): In the said previous EP application cited just above, as in the present application, the said usable filler(s) is/are defined as "calcium carbonate-based filler(s)" that is, in the application and claims, coarse fillers that contain(s) only calcium carbonate(s) (possibly of various origins, such as various natural rocks GCCs or various PCCs) which means with no other filler of a different type, such as kaolin, bentonite, etc. known to the skilled man, and is/are preferably provided (when the filler(s) is/are or contain(s) GCC(s)) by a carbonated rock or more generally mineral material(s) comprising at least 50-65% by weight (dry) of $CaCO_3$, preferably more than 80%, still more preferably more than 90%; those filler(s)s are selected among:

natural calcium carbonate(s) or ground calcium carbonate(s) (GCC(s)) such as, non limitatively, GCC from marble, chalk, calcite, or from other natural and well-known forms of natural calcium carbonates which preferably meet the above % criteria;

PCC(s) which is a precipitated calcium carbonate, and exists under various well-known forms, depending on the well-known precipitation/preparation process.

or a mixture of said $CaCO_3$-containing rocks or mineral materials with each other as well as blends or mixtures of GCC(s) and/or PCC(s).

The GCC/PCC ratio can be chosen from 0-100 to 100-0% by dry weight, preferably from 30-70 to 70/30% by dry weight.

Usually a "filler" has the following properties:

Purity (methylene blue test) is lower than 10 g/kg, preferably below 3-5 g/kg, preferably below 1-1.5 g, with a most interesting value at 1.2 g/kg. See NF P 18-508 2012-1 4.2.6 referring to NF EN-13639.

Mean diameter or $d_{50}$ is about in the range of 1-3-5-6 to 30-50 micrometers measured by using the Malvern 2000 PSD equipment/methodology or Sedigraph. See the above NF P 18-508 4.3.2.

As will be seen below, the d50 range of about 1-5-6 microns corresponds, for the fillers featuring a Blaine surface above about 1000 m2/kg, to ultrafine fillers (UFs); d50 above 6 microns is the domain of coarser or coarse fillers, hereafter "fillers". In this application, when ultrafine fillers are considered, the wording "ultrafine" or "ultrafine fillers" or "UF" will be used.

Blaine surface, which is a characteristic feature of fillers, as is well-known, is in the domain of 180-2000 $m^2$/kg, preferably of 300 to 800 $m^2$/kg, as measured under an EU Standard (European standard EN 196-6).

As discussed above, UFs have a Blaine surface above about 1000 m2/Kg in addition to a d50 below 5-6 microns.

The above definition of "calcium carbonate-based filler(s)" is also valid in the present application, though the present invention uses the said fillers in a synergy: such coarse calcium carbonate based filler(s in admixture with an ultrafine filler ("UF") and at least a superplasticizer as explained herebelow.)

As is known, a "cement" (in the above mentioned wide sense) composition or "system" is mainly made of:

Cement (or cementitious composition or hydraulic binder)+mixing water (or mixing aqueous composition allowing setting but not interfering with the system)+optionally (usually inert) particulate and/or fibrous filler(s)+ inert agglomerate(s) such as optionally sand+optionally inert gravel (plus optionally well known additives not to be mentioned in detail nor in full in the present application, such as setting accelerators, setting retarders, air entrainment agents, etc. . . . )+miscellaneous "routine" additives aimed at matching the precise need of the end-user.

Aggregates such as sand, inert gravel or "all-in" aggregates are known materials so commonly used that no description is needed here.

As discussed above, the invention relates also equivalently (under the generic term "cement" for simplicity) to mortars compositions or "systems" (like above including an aggregate like sand but no gravel) and cement compositions (same as above but no gravel and no sand).

"Mainly" means here that the system may contain some impurities or traces of additives or adjuvants, not to be mentioned in the present application, such as air entrainment agents, accelerators, retarders, etc.

"Mixing water" will mean in this patent application plain mix water or aqueous mixing compositions, that is mainly water plus usual additives, allowing the normal setting of the "cement" compositions, without interfering with the other properties of the overall composition, or only, via the additives, to improve some usual properties.

"Filler(s)":

In this invention "filler(s)" means coarse "calcium carbonate based filler(s)" which have been precisely defined hereabove, that is fillers containing under any known form (namely GCCs and/or PCCs), only $CaCO_3$ particulate material, plus optionally some other inert filler particles or fibrous material such as hemp etc. . . . . We remind here that in this application, "fillers" means "d50 above 6 microns" that is coarse fillers.

It was not disclosed in the above quoted EPA to treat such a "filler" with at least one ultrafine filler (hereafter "UF") since there existed a strong prejudice against mixing a coarse filler with an UF. Actually, the then predictable result of such a blend would have been an unworkable mix of coarse and ultrafine particles that could lead only to some undefined "mud" instead of a workable slurry.

Actually the expected difficulties have been encountered but overcome by further R&D work and the above mentioned synergy with a superplastifier.

In this whole application and claims, "inert" shall mean a material which has no noticeable (or negligible) impact or interference with the process of the invention and the obtained compositions, products and applications. Given the involved ingredients, this will be easily appreciated by any skilled man.

The prior art "cement" (in the wide sense as defined above) systems to date are therefore mainly made of:

Cement (or hydraulic binders or cementitious compositions)+mixing water (or mixing aqueous compositions not interfering with the system)+optionally aggregate(s) such as sand+optionally gravel+fillers(s)+"routine" additives.

In the prior art, "filler(s) means coarse filler(s), never a blend of coarse filler(s) and UF filler(s).

It is also known that cement/hydraulic binders/cementitious compositions, cements, mortars and concrete compositions can be basically sorted out into:

DRY systems (poor quality or "low") (casting is performed with high vibration and energy).

PLASTIC systems (medium quality) (medium vibration and energy).

(The two above categories may also be named "standard" by the skilled man). FLUID systems (High performance or "HP") (low vibration and low energy).

(The "fluid" or "HP" systems are also named "technical grade" by the skilled man)

This categorization remains valid in the present invention as well as the herebelow test.

A very simple test is used to classify the systems, using a "mini cône à chape" known as "self-levelling test" or "screed flow cone test".

The test is well known and is conducted as follows, according to the recognized Standard EN 196-1; the said standard defines accurately the mixer or kneading (also malaxing) device to be used, the speed of rotation, and each and every such data useful for reproducing the test. Therefore, no more explanations or definitions are needed here for the sake of clarity or reproducibility.

For simplification, we remind here that "cement" will encompass in this whole application not only cement material, but also cementitious compositions and hydraulic binders (other than cement) compositions, and their blends and technical equivalents. As indicated above, it also encompasses corresponding mortars and concretes.

Self Levelling Test:

Basically, a cement or mortar or concrete "system" is prepared by mixing the above ingredients according to usual practice, recalled here-below in more detail though the process conditions are well known, then is poured in accordance with the above Standard conditions, into an inverted cone which is perforated at its bottom (dimensions are also given by the said Standard as well as each and every useful data of the test).

The cement or mortar or concrete system therefore flows into and out of the said cone, namely through its bottom aperture, and falls onto an horizontal plate to form a "chape" ("screed").

It there forms a "galette" or "cone spread" also known as "dry to plastic or fluid form" which "spreads" and whose diameter is measured, and whose aspect is separately visually inspected for example for stickiness and "thickness", and "flow speed", etc. . . . ; the latter property when "thick" or sticky" or "pasty" or "low flow" reflecting a "slow" or "viscous" mix, that is, especially if "thick", or worst "dry", hard to handle. To the contrary, a high flow speed and a fluid aspect corresponds to a nicely workable product, of the "FLUID" type.

The larger the diameter, the more flowable the system. For a given high consistency, as targeted by the invention, this is the major test.

Given the quality of the initial filler to be used in the concrete system, namely its place of production, morphology etc. the resulting cone will vary in diameter, this indicating a variation in flowability. Attention has also to be paid to the "cone" used, which plays a role in the obtained diameter. All this is abundantly known to the skilled man.

As an example, a GCC which is known to use no or almost no mixing water, and shows such valuable properties, will lead to a very fluid, non sticky cement or concrete composition. Such a composition will be fully usable for "technical" (that is, "high performance" or "HP") concrete compositions, called "FLUID" above.

If to the contrary, the filler namely GCC filler absorbs or uses a noticeable amount of water, or contains some impurities, etc. the resulting composition will be less fluid and become to be somewhat sticky. The end user will be forced inter alia to either add a corrective adjuvant (with an associated extra cost and an associated risk of secondary effect of the composition as a whole) and/or add extra water (thus being detrimental to consistency and inducing associated risks). Those compositions will be used for medium quality compositions, called "PLASTIC" hereabove.

At the other end of the ladder, using a filler namely a GCC of poor quality will lead to a composition which will exit the mixer under the form of sticky granulates. Those will be used only for DRY concrete compositions, NOT part of the invention.

The test will be sufficient for a skilled man to rate the starting GCC and/or PCC (s).

The same is valid mutatis mutandis when using a PCC or a GCC/PCC blend.

In order to provide the skilled man with useful guidelines and information about the meaning of "low", "medium" or "HP" filler, we attach the TABLE A where ten fillers A to K of various origin and morphology (as indicated for characterization by the skilled man) have been tested for various properties and qualities, or drawbacks, with the classification "low" "medium" or "HP" being added on each line.

We also attach the TABLE A BIS which defines the time ranges a mixture is considered low medium or HP and the corresponding times for the V-funnel test.

This TABLE A BIS shows the ranges which define the low medium and High performance mixtures. Due to the ranges 30-120 sec, 10-30 second and <10 second the skilled person easily can recognize in which part of the ranges his mixture is i.e. in- or out-side and how to adapt accordingly.

The contributions of the microfiller to the rheological properties of the mortars were measured by slump flow with a mini cone and flow time through a V-Funnel. Table A BIS shows the microfiller performance evaluations for concrete.

There in the Experimental methods * the LG16 test is described as well as the Slump flow and flow time, and the geometry of V-Funnel.

It is referred in the present application to standard NF EN-934-2 which defines the role of adjuvants. Reference should be made also to standard NF EN 206-1 which among other refers also to the 28 d compression resistance and to EN 197-1:2000 defining "aluminosiliceous" materials in sections 5.2.3. and 5.2.7, as well as standard EN 18-508 definition of "UF" in 4.3.2.

TABLE A

Characterization of "low", "medium", "HP" fillers and their aspect

| Treatment Agent Code | geological designation (age) | Type | d50 | Blaine | Blue (Methylene Blue Test) | (3 g) | (4 g) | Evaluation | visual evaluation |
|---|---|---|---|---|---|---|---|---|---|
| A | white chalk facies (90 Mi) | chalk | 1.0 | >1400 | 2.0 | plastic aspect | 220 | low | slow, very thick |
| B | white chalk facies (90 Mi) | chalk | 2.2 | 1120 | 2.7 | 280 | 340 | medium | thick |
| C | urgonian facies (115 Mi) | calcite | 3.1 | 1171 | 0.3 | 200 | 290 | low | slow, thick |
| D | bioclastic facies (160 Mi) | calcite | 6.0 | 720 | 1.0 | plastic aspect | 338 | medium | plastic |
| E | urgonian facies (115 Mi) | calcite | 6.5 | 395 | 0.3 | 460 | 475 | HP | fluid |
| G | upper jurassic (130 Mi) | marble | 17.0 | 363 | 0.3 | dry aspect | 365 | medium | slow, heavy |
| H | upper jurassic (120 Mi) | marble | 13.4 | 385 | 0.3 | 337 | 413 | low | slow, viscous |
| I | H + 5% B | X | X | X | X | 190 | 390 | medium | slow, viscous |
| J | H + 15% B | X | X | X | X | 427 | 436 | HP | fluid |
| K | H + 20% B | X | X | X | X | 340 | 410 | medium | fluid, thick |

TABLE A BIS

| | Low | | | medium | | | | | HP | |
|---|---|---|---|---|---|---|---|---|---|---|
| | A | C | H | B | D | G | I | K | E | J |
| 3 g | plastic | 200 mm | 337 mm | 280 mm | plastic | dry | 190 mm | 340 mm | 460 mm | 427 mm slump flow |
| 4 g | 200 mm | 290 mm | 413 mm | 340 mm | 338 mm | 365 mm | 390 mm | 410 mm | 475 mm | 436 mm |
| V-funnel 4 g | | 30-120 sec | | | | 10-30 sec | | | <10 sec | flow time |
| time | 82 | 54 | 66 | 28 | 20 | 17 | 24 | 15 | 6 | 8 |

One uses 3 g or respectfully 4 g of fluidifier Premia 196™ commercialised by the Firm CHRYSO, which acts as a routine "bottom-tank" fluidifier and which is a commercial product at a concentration of 25.3% by weight (dry extract measured along the Standard EN 480-8), by DRY weight of cement.

In the said Table A, "+15% B" evidently means an addition of 15% of the product B, to form a blend or mix, the % being in DRY WEIGHT/DRY MIX WEIGHT.

Equally, columns "3 g" and "4 g" means that 3 or respectfully 4 g of the said routine fluidifier have been added by DRY weight of the cement component alone. In the following this product will be named according its routine function, that is "fluidifier". The skilled man knows that such a fluidifier is routinely added in the "bottom" of the kneading tank when preparing a cement composition.

"Mi" means "million years" (dating of the rock)

"Blue" means "methylene blue test" (purity test)

This introduction of this application clearly points out to the need for improved cement or mortar or concrete systems or compositions having a improved compacity (% of dry material, the highest possible), an improved flowability (that is forming a fast or relatively fast-flowing composition, non sticky "galette" or "cone spread" (more simply "cone" or "cone diameter") of large diameter in the above described test, the larger the diameter, the better flowability), and globally speaking a definitely improved "workability" (workability being the ability of the cement or concrete composition to be prepared, processed, handled, and used to form a high performance or "technical" concrete) and a far better "regularity" in the final product properties especially at the end user level.

Clearly, some of those desired properties are antagonistic, and for example one should expect a high % dry material to perform poorly in a flowability test.

TECHNICAL PROBLEM(S) TO BE SOLVED

The main purpose of this invention is to build a process aimed at providing improved, "High performance" (or "HP"), FLUID, cement or mortars or concrete systems or compositions having an improved compacity (percentage of dry material, the highest possible), an improved flowability (that is forming a non sticky "galette" or "cone spread" of large diameter in the above described test, the larger the diameter, the better flowability), and globally speaking a definitely improved "workability" (workability being the ability of the cement or concrete composition to be prepared, processed, handled, and used to form a high performance or "technical" cements, mortars or concrete compositions or systems), using as "filler(s)" (in the general and global sense)

at least a coarse, "low or medium" (or optionally HP) carbonate-based filler treated first with an UF (ultrafine filler), the resulting blend (or fillers blend or preblend) being then treated with at least one superplastifier.

The process will be conducted routinely in the presence of a small amount of a fluidifier.

Another property, which does not exists in the prior art, while the industry is strongly demanding it, is "regularity" of the properties of the final systems.

In some cases, one can accept a cone diameter near to the 300-350 mm range, if the filler is particularly "difficult" to upgrade and if this allows a purely mineral solution to be implemented. The skilled man knows how to design such compromises.

It has been surprisingly found according to this invention, that that set of objectives can be reached by treating the low/medium (or "standard") "filler(s)" in the specific manner as disclosed below, with an UF then by treating this pre-blend with only minute amounts of treating agent(s) (superplastifier(s)), and with a very impressive technical effect.

BRIEF SUMMARY OF THE INVENTION

The invention resides first in a:

PROCESS for the preparation of the above defined cement/mortar/concrete compositions or systems, (for simplicity hereafter "cement" compositions or systems or even "cements"), of a generally known type as defined hereabove containing low or medium "filler(s)" (carbonate-based filler(s)), namely coarse calcium carbonate, namely coarse marble(s), characterized in that it comprises, or consists of:
- at least one first step where the said low or medium "fillers" is/are treated with an efficient treating amount of at least one UF, what forms the "fillers pre-blend", and
- at least one subsequent or second step where the resulting "fillers pre-blend" is treated with a treating agent consisting of or comprising at least a superplastifier.

The process will be conducted routinely in the presence of a small amount of a "bottom-tank" fluidifier.

The two steps may be separated by some additions of routine, inert additives as is known in the art. They are preferably not separated by such intermediate steps so as to take full benefit of the synergy with the superplastifier treatment.

Each treatment step with an UF or the superplastifier may be fractionated, though it is preferable (for practical reasons, nature of the available equipment on site etc. . . . ) that they are not.

"Ultrafines particles" or more simply "ultrafines" or still more simply "UFs" which can be used in the present invention can be defined by
- a d50 from about 1 micron to about 5 or 6 microns, preferably from 1 to 3 microns, and still better of about 2-3 microns, usually <5 microns.
and
- a high specific surface, usually defined as BLAINE>1000 m2/kg pref. >1500 m2/kg, pref. up to 2000 M2/kg.
- Reference can be taken as to CaCO3 additives ("additions calcaires") to a cement from NF P 18-508 (2012-01), see 4.3.1 (Blaine) (NF EN 196-6) and 4.3.2 which defines the "Highly Fine" additives as having namely a d50<5 microns; which also refers to the "bleu de methylene" test (NF EN 13639)(4.2.6) and other interesting definitions.
- Quite representative examples of such useful UFs are:
- silica fumes (d50=about 1-2 microns),
- such as Condensil S 95 D d50=1.2 microns, Blaine>1500 m2/kg BET (specific surface area measured using nitrogen and BET method according to ISO 9277) BET=16 m2/g
- metakaolin (that is calcined kaolins, d50=about 3 to 5-6 microns) such as Premix MK™ d50=3 microns, Blaine=3.8 m2/g
- chalks of d50=about 1 to 5 microns d50,
- calcites of about 1 micron d50,
- Millicarb™ OG white limestone Orgon, France, (about 3 microns d50),
- marbles of about 1 to 5-6 microns d50,
- Durcal™ 1 or 2 white marble from Salses, France (d50 1 resp. 2 microns),
- "Etiquette violette" ("EV") microcrystalline Champagne Whiting from Omey, France (about 2.4 micron d50),
- Ultrafine siliceous product (Sifraco™ C800 d50: 1.86-2.4 micron BET=2.7 m2/g)
- PCCs (precipitated calcium carbonates) such as of d50=1.52 micron
- Modified calcium carbonates (or "MCC") such as of d50=2.29 microns, in particular those disclosed in U.S. Pat. No. 6,666,953.

When Blaine surface is not indicated in the present application, this only means that the standardized test is not adapted to the fineness of the considered product and/or to its morphology, as is known to the skilled man.

Those products however meet the Blaine surface criteria or very high specific surface as reminded above.

Preferred UFs to be used in the present invention are: EV™, silica fume SF, metakaolin MK, DURCAL™ 1 or 2 and their mixtures.

Modified calcium carbonates (MCC) and PCC can also be used as UF(s).

For completeness, one can say that when the d50 is above 5-6 microns one starts to regard the products as "fillers" not "UF"s any longer.

In the following, the wording "pre-blend of filler+UF" (or equivalently "fillers pre-blend") will therefore mean a pre-blend of at least a "filler" (low or medium) (or optionally HP) which is coarse (d 50>6 microns, usually, as is known, clearly above 6 microns) with at least a UF (d 50<5-6 microns), preferably ONE filler with one or a "mix" of two UFs.

The low-medium fillers which are used in the invention are coarse calcium carbonate(s) based filler(s), namely calcium carbonates of various origin such as marbles etc. . . . and their blends, see the above definition, and can be optionally mixed with "non interfering" fillers, and with "non-interfering" routine, inert, "adjustment" additives.

Evidently, some HP fillers can be also upgraded with the present invention, though they are already HP fillers.

The said "treatment" of the filler(s) particles with the UF particles as mentioned above is performed by a mere mixing or blending.

It is quite surprising to notice that this mixing of coarse particles of fillers with UF particles leads to a "workable" product such' as a cement composition or slurry. The general knowledge of the skilled man was that such a mix would lead to a mud-like, pasty, etc. . . . mixture, that is a definitely UNworkable and UNusable slurry. One merit of the inventors is to have overcome that solid prejudice.

It is surprising to note that such a filling ("remplissement") of the voids between the coarser or coarse carbonate-based (low or medium) fillers particles with the ultrafine particles of the UF(s) instead of producing as expected a solid and strong mass of particles (due to the reduction of the interparticles voids and therefore the "compacting" of the whole mass), produces to the contrary an Unblocking effect and an upgrade effect from low/medium (standard) to HP/technical/fluid fillers.

As mentioned above, the second prejudice which the invention overcomes is that, when mix water is added, the said blend of low/medium fillers with UF(s) does not produce as expected a mud or pasty cement composition that would be Unworkable, but to the contrary a workable, non pasty, non sticky, cement composition with a large "galette" diameter in the "cone test" or "self-levelling test".

It is probably because one expected that the voids to be filled with UFs would create a solid and strong mass of compacted particles that one believed that no dispersion would be possible so that when adding mix water, a mud or pasty product would have to be expected. So the two prejudices overcome by the present invention were actually interconnected with each other for a skilled man, therefore creating a very solid (because very coherent) prejudice.

In the above, "interparticles" has to be understood as globally all the kinds of particles present in the "cement" system: it can be mainly hydraulic binder and filler (coarse and UF) particles in case of a cement composition, or the same plus sand in case of a mortar, or the same plus sand and gravel (or any sort of know "aggregates") in the case of a concrete.

It is equally surprising to note that the treatment of the fillers preblend with superplastifier(s) a) is possible and b) provides an important technical effect: one would have reasonably expected that the filling of the voids between the coarse particles of fillers with the UF particles would have either made most of the particle surfaces Unavailable for any chemical treatment, and namely any surface treatment such as ionic etc. . . . or would have restricted the chemical treatment to the only portion of the particles being directly accessible to the treating superplastifier or even that the said superplastifier would have acted on the per-blend in such a way as to block it (this because it is already surprising to blend coarse and UF particles without producing a mud-like system, so additionally mixing a chemical agent was evidently adding to the risk of destroying that unexpected fluidity of the pre-blend).

The tests performed on marbles are particularly surprising.

The treatment with the superplastifier!s) is believed to treat only the calcium carbonate(s) part of the filler(s), and for example not the other particulate or fibrous fillers, IF ANY, believed to be inert in this process.

By "comprising or consisting of" we mean that the starting low-medium (or optionally already HP) fillers may consist of calcium carbonate(s), optionally mixed with non interfering fillers, and that the treating agent(s) can be only superplastifier(s) or blends of superplastifier(s) with non-interfering plasticizer(s) (as defined herebelow) and/or routine, inert, additives.

As to the treating UFs they are as described above and may also contain non-interfering amounts of "inert" fillers".

By "efficient treating (or "treatment") amount" or "efficient surface coverage of the fillers particles or grains" or "efficiently treated", we mean in this application that at least 50%, preferably at least 60, or better at least 80 or 90% or still better closer to 100% of the surface of the particles of the filler(s) (that is the low or medium filler preblended with an UF) have been subjected to a physico-chemical interaction with the superplastifier(s). This physico-chemical interaction is not entirely understood as of the filing date, only the EFFECTS and RESULTS are duly identified and correlated to the treating superplastifier(s), but, without being tied by any theory, the applicant considers that the said interaction or "treatment" is a surface treatment or "surface-covering" treatment involving ionic, physical, mechanical and/or chemical, treatment(s) and via said interaction(s). This efficient treating or treatment amount must therefore be important enough to treat the said % of particle surfaces, as will be explained and disclosed in more detail below.

It is surprising to consider that the said treatment is efficient even though the fillers contain coarse and UF particles, and that the to-be-expected mud does not form during the treatment, nor during the final preparation of the cement composition.

By "surface-covering" we mean that the superplastifiers are supposed by the applicant, without being tied by a theory, to engage in electrical charge potential interactions with the ionic charges of the surface of the (low/medium filler+UF) pre-blend, which promotes the fixation of the superplastifier onto and/or closely around the surface and so reduces the "accessible" surface of the particle having no surface saturation of the grain by said treatment.

This corresponds to an "UNblocking" of the particles or grains, what first "triggers" then promotes the mobility freedom of the particles with respect to each other.

This is NOT a fluidification process: this is a "trigger action" leading to an UNblocking process or sudden removal of interparticle interference/friction without which the rest of the properties cannot be reached and especially not the required fluidity.

It is believed that this so "triggered" "Unblocking" function is one of the very key parameters allowing to appreciate the appropriate "treatment" or "surface coverage".

By "comprising" we mean in this application that the chemical treating agent of the "fillers pre-blend" can be made only of superplastifier(s) (one or more mixed together, preferably one) or of blends of superplastifier(s) displaying mutual non-interference (that is, unable to noticeably degrade the above "treatment") amount or proportion of known plasticizer(s) for the purpose of cost-saving, as explained in greater detail here-below.

As will be seen in the examples, it is equally surprising to note that a synergy develops between the "fillers pre-blend" and the treating agent (superplastifier(s)).

Process options are as follows:

1 According to the best mode of the invention, as defined to date, the said fillers pre-blend (coarse, low or medium fillers)+UF(s)) is efficiently treated with the superplasticizer before being introduced in the kneading or mixing device ("pre-treatment" also named "initial"), such as in an outside mixing Laboratory equipment; in the industrial scale, such a pre-treatment can be performed in an industrial device such as the Lödige mixer or any other industrial kneading or mixing equipment known to the art.

2 According to a less preferred embodiment, the said fillers pre-blend is treated with the superplasticizer after having being introduced in the kneading or mixing device ("inside treatment"). In such a case, it is preferred that the filler(s) and the efficient treating amount of the treating agent(s) (superplasticizer(s)) be introduced in the kneading or mixing device either simultaneously or in a manner such that the filler(s) and the efficient amount of the superplasticizer treating agent(s) are introduced separately BUT at a very close location and time.

3 According to another embodiment, the said fillers pre-blend is efficiently treated partially before being introduced in the kneading or mixing device ("partial pre-treatment") (such as in a well-known Lödige equipment) and partially after having been introduced in the pre-treated state in the said mixing or kneading device, the total of the two partial treatments being "efficient" in terms of treatment, surface coverage etc. as defined above. It is preferred to operate with the second part or amount of the treating agent(s) being introduced in the kneading or mixing device either simultaneously with the pre-treated fillers pre-blend or in a manner such that the pretreated fillers pre-blend and the second part of the treating agent(s) are introduced separately BUT at a very close location and time.

When the fillers pre-blend is to be treated at least partially inside the kneading or mixing device, ("mixed treatment"), the skilled man will understand that a corresponding amount or proportion of treating superplastifier(s) has to be added directly into the said kneading or mixing device or in admixture with the considered filler pre-blend just before the introduction in the kneading or mixing device, in the latter case, for example, by introduction on the weighting device ("balance") which is provided just before the powdered products are introduced into the kneading or mixing device. "Just before" will be easily understood as a place and time where the fillers pre-blend and treating agents cannot or have no time to be mixed together, what would induce the beginning of the treatment. A good example is the balance where the two powders are placed together then almost immediately introduced, with no previous kneading or mixing, into the kneading or mixing device.

It is much preferred that the point and time of introduction of the said proportion of treating agent be as close as possible to the point and time of introduction of the partially treated filler(s), so as not to be diluted in the pre-existing products already present in the mixing or kneading device (such as sand, gravel, mix water, optionally routine additives, so that the treating agent be fully available for the fillers pre-blend.

This is also true in relation with the option "inside treatment".

In both options, actually, if the fillers pre-blend is added at a location and at a time too far form the location and time of the treating agent, whatever the order of introduction, one could shift to a treatment which would be too late: this would actually make possible for the treating agent to be "consumed" by other ingredients before the filler is introduced, or, in the case of a filler introduced first, lead to a late treatment that is the "post-ajout" mode ("post-addition" of the superplastifier treating agent(s) a certain time after the fillers pre-blend has been introduced; one can see that the results of that mode are far lower than with a pre-treatment, a mixed treatment or an inside treatment according to the invention.

Any post ajout has to be avoided.

The invention also covers an industrial option characterized in that at least a portion of the efficient amount of treating superplastifier(s), or the totality of the said efficient amount, is mixed with the fillers pre-blend on the weighting device ("balance") leading to the kneading or mixing device. This can be regarded either as a simultaneous addition, or a "near-simultaneous" addition.

Some of the above options are evidently complicated and/or require additional equipments or modifications of the existing equipment. They are therefore far less preferred, the "pretreatment or initial mode being the most preferred.

The "best mode" to date to avoid those drawbacks is clearly to prepare a pre-treated fillers pre-blend (that is, pre-treated with superplasticizer(s)), then to deliver it to the end user and to introduce it as such into the kneading or mixing device, most preferably after the mix water and sand and gravel, if any, have been introduced and allowed to be successively malaxed or kneaded as is usual in this industry (the difference being that, in the present invention, the fillers pre-blend (low or medium carbonate based filler pre-blended with UF) is TREATED, while it is NOT in the prior art, where additionally there is NO UF).

As discussed above, it will be pure routine for a skilled man to perform a few self levelling tests, which are perfectly known to him a require no costly or voluminous equipment, and no "daunting task", so as to adapt the "efficient" dosage of the treating UFs) vs. the filler(s) and/or to define the moment the treatment can be stopped.

The invention also covers such a

A pre-blend of coarse, low or medium (or optionally HP) "calcium carbonate-based filler" pre-blended with at least an UF as a new industrial product (as mentioned above, such a blend of coarse and UF fillers was not supposed to be possible, and was expected to lead to a mud like product when mixed with aqueous mixing fluid so that it is novel and surprising to design such a pre-blend, knowing that such a mix would be thereafter impossible to segregate again)

B the aqueous compositions obtained by mixing the above blend (A) of coarse filler(s) with UF(s) with an aqueous system such as mix water, aqueous mix fluid, as a new industrial product C the blend (A) or the compositions (B) which have been treated or pretreated with at least one superplastifier or aqueous system containing superplastifier(s), as a new industrial product, A, B or C being able to be delivered to the end user that way, optionally after any treatment allowing to ease the transportation and/or addition of routine, inert additives.

It is known, in Laboratory trials, and due to the small volumes or loads involved, to sometimes first place some small amount of "fluidifiers" in the bottom of the laboratory mixing device: some of those fluidifiers may be superplastifiers, many are not. However, even when some small amounts of superplastifiers-"fluidifiers" are present, they cannot "treat" the fillers pre-blend "efficiently" as in the invention, that is according to the definition given hereabove. They merely act as fluidifiers, so that they interact mainly with the other first constituents of the load, such as sand, gravel, mix water etc., which are malaxed together, alone, for a given period of time, so as to conveniently fluidize the particles or aggregates in the suspension; in this operation, they are "fixed" or "consumed" by the said aggregates particles that precisely need to be fluidized. If they were not, there would be no fluidification. Therefore, they are then no longer available for the fillers; even if, to be absolutely complete, we assume for a second that some (mandatorily very small amount) such fluidifier were quite partially and quite marginally available, it could only quite marginally interfere with the fillers pre-blend, that is in any case absolutely not with as a result the "efficient" treatment effect or "surface coverage" effect or "unblocking" effect generated by the superplastifiers deliberately added in the present invention at a moment and at a time such as to reach the point of "efficient treatment". Simply, the necessary "threshold" or "TRIGGER" for UNblocking could not be reached by far, and, with no "trigger", there could be no "Unblocking" at all.

No prior art ever reported any improvement or upgrading which might have a relation with the fluidizers (many of fluidizers being additionally just plastifiers, not superplastifiers); no doubt that, especially in an R&D Laboratory, if such an upgrading had been noticed, it would have been reported. This is simply because the "trigger" effect for "unblocking" never occurred.

In the industrial scale, one most generally uses NO fluidifiers, or in some exceptional cases in minute amounts, and in order to "fluidize" the mix: there again, the fluidifiers are "used" to fluidity sand, gravel, etc. and are not available for the fillers, and therefore can in no way "trigger" the "unblocking" of the system, the essential part of the invention.

As indicated hereabove, the said low or medium filler(s) are made of calcium carbonate(s) or blends thereof, that is mainly GCCs or PCCs or blends of GCCs or blends of PCCs or blends of GCCs and PCCs.

Non limitative but appropriate of low/medium carbonate) based fillers are:

Betocarb™ EC or SL d50=9, resp. 7 microns Blaine=690, resp. 462 m2/g

Omyacarb™ 10 PB or ES origin Mexico d50=about 10.8 resp. 10.4

Betocarb™ SL from Salses, France d50=18 microns Blaine=365 m2/g

The invention also covers the said

"CEMENT COMPOSITIONS" (in the wide sense defined above) incorporating (A) or (B) or (C) above, and namely incorporating the said pre-blend of low or medium filler(s) treated subsequently with at least one superplastifier, and their USE in any "cement" industry, and in the "CEMENT ELEMENTS or PRODUCTS" so obtained from the said compositions, and the USE of such Cement elements or Products in the "cement" industries.

By "CEMENT ELEMENTS or PRODUCTS" it is meant in this whole application each and any piece of building or construction (or any piece or product for any other industrial purpose known to the skilled man, including off-shore cementing, or oil wells cementing, using "cement" compositions) such as blocks, etc. . . . , prepared from the said compositions.

By "cement" industries, we mean here any industry where the above products are known to receive a useful application, such as the building and construction industry, oilfield or geothermal cementing industry, and any such industry evidently known to the skilled man.

This will be detailed herebelow.

"Setting time" in this application, when mentioned, will be understood as established under Standard EN 196-3.

DETAILED DESCRIPTION OF THE INVENTION

In a detailed and most preferred ("best mode" as of today) embodiment, the said PROCESS for preparing the said "cement" compositions or systems is characterized (in the so-called "pre-treatment" or equivalently "initial" mode) by the fact that it comprises or consists of:

a) providing a powder of dry, coarse, low or medium (or optionally HP) calcium carbonate filler(s) as defined above as "calcium carbonate(s)-based filler", hereafter "filler or filler(s);

b) mixing the said filler(s) with an efficient treating amount of at least one ultrafine filler or "UF", thus providing the "fillers pre-blend" (of low or medium filler+UF)

c) mixing the said fillers pre-blend with at least one superplastifier, thus producing "pre-treated (or "treated") fillers pre-blend", d) introducing the said pre-treated (or "treated") fillers pre-blend into a kneading or mixing device already containing mix water or a composition of mix water possibly containing routine or "non-interfering" additives ("mix water or aqueous mix composition") (hereafter for simplicity "mixing water")

e) optionally adding before or after the step c), preferably before, aggregates such as sand and/or gravel, and possibly other "non interfering" routine additives or adjuvants, f) kneading or mixing the said load during an efficient period of time, g) recovering the said "cement" composition.

By "not interfering", it is meant not interfering or not noticeably with the said considered treatment or inventive process.

By "efficient period of time", it is meant a total period of time leading to an homogeneous mixture or blend, in the order of 2-15 min, preferably, for the "standard" mixtures or blends, 30-60 s. This will be detailed hereafter.

An example of end-user application is as follows: if the end user targets medium or "standard" properties for its final cement composition, for example with a final mixing within his facilities in a fixed installation etc. . . . , he will use compositions which are correspondingly simple that is not specifically complex or sensitive in terms of routine additives, superplastifier, filler etc. . . . ; therefore, the end user will have to mix for a relatively short time such as the above 35-65 s.

If to the contrary the end user targets high-level or very HP properties, he will use correspondingly more complex compositions and more sensitive components, for example a more sensitive filler or superplastifier, or sensitive routine additives aimed at reaching a specific property, etc. . . . and usually he will use less or far less mixing water: therefore he will need to mix for a much longer time such as the above 1-3 to 10-15 min.

Evidently, "technical" composition or system means a "HP" quality (see the "Self levelling test" section above) or "FLUID" see above too, and by contrast a "standard" final composition means a "non-HP" quality, that is, see above, "dry" or more likely "plastic".

In both cases, that is "technical" or "standard" compositions, and as explained in the present application, the common objective is to reach a homogeneous composition, also as explained specifically in the present application, see below "The main essential criteria . . . final product must be homogeneous".

The above working principals are well known to the skilled man and are for completeness only. The above values and examples are to provide guidelines only, which the skilled man will be able to easily use in order to meet the essential "main criteria".

One will understand that it is impossible to provide examples or data for any type of ultimate composition or ingredient, since the interactions are complex, so are the kinetics etc. . . . but the skilled man knows about those parameters.

According to a less preferred mode, the said PROCESS for preparing the said "cement" compositions or systems is characterized in the "mixed-treatment" mode by the fact that it comprises or consists of:

a) providing a powder of dry, coarse calcium carbonate (s) "low or medium" filler(s) as defined above b) mixing the said filler(s) with at least an UF to form the fillers pre-blend c) mixing the said pre-blend with a portion or part of an efficient treating amount of at least one superplastifier, thus producing the partially pre-treated fillers pre-blend, d) introducing the said partially pre-treated fillers pre-blend into a kneading or mixing device already containing mix water or a composition of mix water possibly containing routine additives ("mix water composition") (hereafter for simplicity "mixing water")

e) introducing before or during step c), preferably during, into the said kneading or mixing device, the rest of the said efficient treating amount or proportion of the superplastifier(s)

f) optionally adding before or after the steps c) and d), preferably before, aggregates such as sand and/or gravel, and possibly other routine additives not interfering with the said treatment, g) kneading or mixing the said load during an efficient period of time h) recovering the said "cement" composition.

According to still another embodiment, the said PROCESS for preparing the said "cement" compositions or systems is characterized in the "inside-treatment" mode by the fact that it comprises or consists of:

a) providing a powder of dry calcium carbonate (s) based filler(s) as defined above b) blending or mixing the said filler(s) with at least one UF, c) introducing the said un-treated fillers pre-blend into a kneading or mixing device already containing an efficient treating amount of at least one superplastifier, (or receiving it just after the introducing of the said un-treated fillers pre-blend) mix water or a composition of mix water possibly containing routine additives ("mix water composition") (hereafter for simplicity "mixing water")

d) kneading or mixing the said load during an efficient period of time e) optionally adding before or after the step c), preferably before, aggregates such as sand and/or gravel, and possibly other routine additives or adjuvants, not interfering with the said treatment, f) recovering the said "cement" composition.

By "just after" it is meant that the treating agent can be introduced before of after the un-treated filler(s), but in the second case it must be introduced rapidly after the filler(s), say, in a matter of some seconds to 10 s or so, in order for the filler to remain fully available for the treating agents without any disturbance due to the kneading or mixing with sand, gravel etc.

It is usually most preferred to first introduce the aggregates such as sand and gravel into the kneading or mixing device, and mix them optionally with a small amount of water and/or of fluidifier (see above), before performing the other steps.

Efficient": In the above Process, the term "efficient" means that the treatment leads to a workable cement composition, according to the self-levelling test or "cone" test, as shown in Table A above, that is leads to a wide diameter of the "galette" AND to a fluid, non sticky, not thick, not "slow", not "dry", product as could be seen by "visual inspection", that is matches the TWO criterias required to reach the qualification as HP or FLUID or TECHNICAL "cement" (in the wide sense defined above) composition or system.

As discussed above, it will be pure routine for a skilled man to perform a few self levelling tests, which are perfectly known to him a require no costly or voluminous equipment, and no "daunting task", so as to adapt the dosage of the treating UFs) vs. the filler(s) and/or to define the moment the treatment can be stopped.

As treatment agent, is used at least one superplastifier (and possibly at least one superplastifier with possibly some inert amount of plasticizer for cost control).

As mentioned above, a routine amount of fluidifier can also be preferably used.

According to the above definition of the treating agent, the so called treating agents for the fillers consist of/or comprise superplastifier(s), or comprise at least one superplastifier (and optionally at least one plastifier in order to reduce the overall costs), and preferably consist of at least one superplastifier and optionally at least one efficiently cost-reducing amount of plastifier, and most preferably one superplastifier and optionally one efficiently cost-reducing amount of a plasticizer.

Superplastifiers are well-known agents and are to the best selected among the following products or families and their blends:

Polycarboxylates, polycarboxylate ethers, or much less preferred products manufactured from sulfonated naphthalene condensate or sulfonated melamine formaldehyde. The skilled man knows these products, which are additionally disclosed in the prior art as cited above.

One will use preferably sodium salts of polyether carboxylates which are disclosed, as well as their preparation, in U.S. Pat. No. 5,739,212.

In this invention, the best mode treating agents (product A and product B) appear to be, in the superplastifiers families, of the polycarboxylate ether formulae.

Superplastifier(s) and especially Products A and B are disclosed in WO 2004/041882.

To be noted, the products codes A to K in Table A are FILLERS to be characterized, NOT to create a confusion with the preferred treating agent(s) A and B above which are (superplastifiers(s)).

By "efficient period of time" it is meant here a period of time of about 35-65 s for the standard compositions, and from 1-3 to 10-15 min. for the more "technical" that is more complex and/or more sensitive compositions, as is known from the skilled man.

For a "standard" (that's is, low or medium) composition, an example can be a kneading time of 10-15-20 s for the gravel and sand (dry kneading or mixing is preferred), then of 10 s for the kneading or mixing of the hydraulic binder and untreated filler, then 10-15 s for the kneading or mixing with the treatment agent(s) and mix water (this in the so-called "inside treatment mode"), then 5-15 s for the final kneading or mixing with the final "routine additives".

The main and essential criteria for the said "period of mixing" is that the final product must be homogeneous and the treating agent(s) be not absorbed or adsorbed onto the sand or gravel, or the less possible extent.

By "efficient amount" of plasticizer" (when present with the superplastifier) it is meant in this application an amount or proportion of plastifier which is able to reduce the cost of the treatment without interfering negatively with the system and namely the filler(s) behaviour, namely in terms of surface activity and reactivity); the same criteria applies to the "inert additives".

By "comprising" we mean here that the said treatment agents consist essentially or entirely of superplastifier(s) as defined, and may contain as explained a cost-reducing efficient amount of at least one plastifier, and may also contain inert additives useful for the intended final application, such as anti foam agents, retarders, accelerators etc. absolutely known to the skilled man.

Usual additives of inert nature can be added at injection points known to the skilled man, as said earlier.

The mixing or kneading device can be operated in a batch mode, a semi-continuous mode, or a continuous mode, the adaptations being within the easy reach of an average skilled man.

Dosage of Superplastifier(s) Used for the Pre-Treatment and Treatment of the Filler(s):

At the end-user location, the dosage in superplastifier(s) is ranging from 0.3 to 2-3 kg for 100 kg of cement, preferably 0.8 to 1.2 kg/100 kg of cement, on a DRY/DRY basis.

In laboratory conditions, the same proportion ranges from 0.05 to 0.1% by weight of the carbonate (DRY) that is 0.1 to 0.3 kg/100 kg of cement, on a DRY/DRY basis.

In laboratory conditions, for establishing the Table A, one used from 0.8 to 1.2 kg/100 kg cement, on a DRY/DRY basis.

At the end user location, the ratio superplastifier(s)/plasticizer(s) can be from 100/0 to 95/5-90/10, preferably no less than 85/15 on a weight dry basis.

The invention also resides in the said CEMENT (in the broad sense given above that is cement, cementitious compositions, mortars, concretes) COMPOSITIONS (OR SYSTEMS) incorporating the said preblend of fillers+UF(s) treated with at least one superplasticizer per se, since they are distinguishable from the prior art similar compositions by their physical structure and their properties, or as prepared by the above process of the invention, as well as compositions (A), (B) or (C) above, and in the USE of those cement systems or compositions for making concrete elements, and ultimately in the CEMENT ELEMENTS incorporating the said treated pre-blends of low or medium filler+UF per se, since they are distinguishable for the same reasons as the compositions, and as prepared by using the said compositions.

as well as in the calcium carbonate-based filler(s) as pre-treated by the pretreatment process of the invention.

Another objective is evidently to meet Client's requirements which are that the "galette" or "cone" be above 350 mm in diameter, most preferably above 4000 mm, or still better, above 420 mm, at a cost-effective dosage.

This can be easily and quickly appreciated by a skilled man by performing the cone and plate test.

This test allows therefore to discriminate the fillers and UF combinations, with the assistance of the specification and examples, and the common general knowledge, and to select the best-performing superplastifier(s), in view of the final properties required by the end user.

The families of superplastifiers are very well known to the skilled man. The merit of the inventors was not to discover those families, nor their use as superplastifiers in the common sense of the prior art, but to discover that one can WIDELY UPGRADE a low-medium filler for cement (and hence the cement compositions) by treating the said the Calcium Carbonate-based filler first with at least one UF then with at least one superplastifier.

It has been noted that certain compositions are so low in cone diameter ("self levelling test"), stickiness, etc. that there is no way to upgrade them; this demonstrates the difficulty of the invention's task.

Some can be upgraded but only by adding large proportions of the superplastifers used according to the invention and even in such cases, the diameter requirement can be matched, BUT the "galette" or "cone" remains sticky and thick in consistency, what means that the result, despite the fact that the diameter of the "galette" is correct, the composition cannot be regarded as upgraded to HP concrete composition.

According to the present invention, the synergistic combination of the said low filler with UF(s) prior to the chemical treatment with the superplastifier(s) allows to reduce the % of superplastifier treating agent and hence renders the process cost effective even for such very low fillers.

It is necessary to keep in mind that, for a concrete composition or system to be acceptable as HP composition, or upgraded from low or medium quality to HP quality, TWO features MUST be met simultaneously:

the diameter of the "galette" or cone must be above about 350, or better above 400, or still better above 420 mm, AND the "galette" or cone spreading must NOT be sticky or thick or dry in consistency, and must feature a correct flow rate.

Most preferably, there should be no exudation or water-release or outgassing, though some minor such effects can be tolerated when the upgrading is globally impressive.

This is another measurement of the very tough challenge which this invention wishes to overcome, and of the very high technical and scientific input brought by the invention to the current state of the art.

As can be seen from the attached Table A, the "poor" fillers can NOT be upgraded since they never meet BOTH features.

This is also true for some "medium" fillers such as product D, B, G, I and K which may show a good fluidity for example at a dosage of 4 g BUT have a bad aspect or handling behaviour.

With the help of the Table A and of the above and below comments, the skilled man will be able to discriminate the fillers which CAN be upgraded by the invention, and those (regarded as "low" as per the test of the Table A) which can NOT.

To achieve these objectives, the skilled man bears in mind first that a certain water/cement ratio is directly linked to the workability of the composition and that it is also imperative to develop high performance qualities in the end product, such as high performance or "technical" level of setting properties, drying properties, mechanical strength, namely compressive, strength etc.

As specified above, the invention relies first on the surface treatment of the $CaCO_3$-based FILLER(s)+UF(s) pre-blend with one or more superplasticizer(s) (optionally in admixture with one or more plastifier), and usually in the presence of a routine amount of fluidifier. The amount of plastifier will be calculated easily by the skilled man as being the efficient cost effective amount, not interfering with the overall treatment, that is not degrading the results of the cone test, see above.

Two superplastifiers products which are providing the best results are (as the "best mode" as of the filing date) products A and B of the polycarboxylate ether family as mentioned above.

It is very surprising to notice that when using the invention, proportions of superplastifier(s) treating agent(s) for the $CaCO_3$ filler(s) as low as 0.03 or 0.05 to 0.1% are sufficient.

It is entirely surprising to notice that such minuscule amounts of treating agents are capable of upgrading to HP quality even medium to poor fillers. As mentioned above, this is due to a synergy that develops between the fillers pre-blend and the superplastifier.

Many such plasticizers, or routine fluidifiers, are known, such as described for example in the CHRYSO patent EP 0 663 892.

Other products have been successfully tested as routine fluidifiers usable in the process of the invention to perform a surface treatment of the carbonate filler+UF pre-blend, such as the CHRYSO™ products described in the above cited EP patent, such as PREMIA 196™, which is reportedly "modified polycarboxylate" or NRG 100 from Mappei™.

Some usual additives may be routinely added such as air entrainment agents, setting retarders or accelerators etc. at a place which is known from the skilled man, for example with the water or after the superplastifiers are added.

As to the "powders" that is the cement and the fillers pre-blend, the cement can be added first, then the filler, or the reverse, or they can be introduced together as a premix.

It is however preferred to introduce the cement and the filler together as a premix, so as to better ensure that both powders will be homogeneously mixed with and wet with the water.

The above are batch modes.

One can also think of continuous modes such as performing the addition in one of the above orders, for example in a kneading or mixing device equipped with an endless screw (with additions at various points along the length of the equipment), possibly with pre-mixes being added at some point(s), or as another example in a series of successive kneading or mixing devices, also with the possibility of adding premix(es) in one of the devices. It will be obvious to the skilled man that especially the latter option (several kneading or mixing devices) has numerous drawbacks, if only the necessary space and investment.

Batch modes are preferred and will be referred to hereinbelow.

Figure 1:
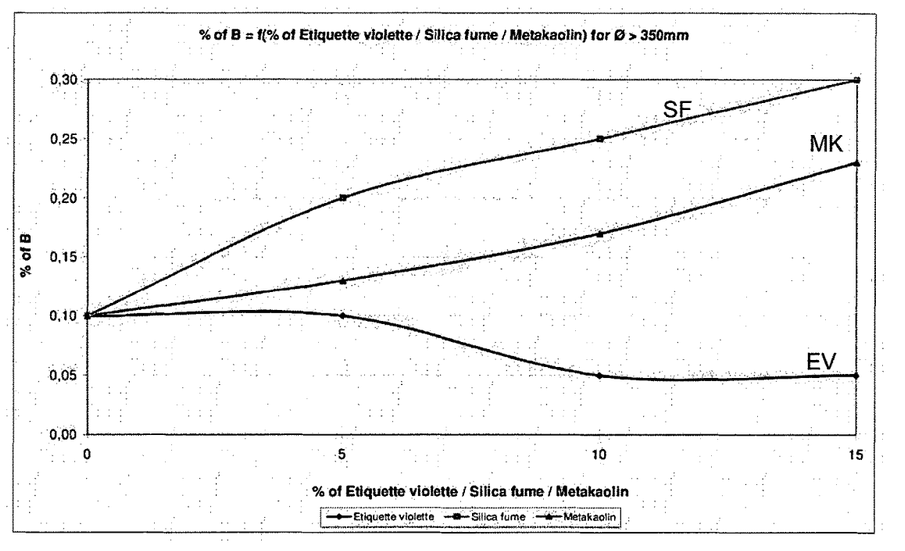
The FIGURE depicts the results from Example 1 with low grade $CaCO_3$, various UF's, and various amounts of Superplastifier B.

Routine tests can help the skilled man to select the most appropriate, in view of the available equipment, of the end user practice, and with the help of the following Tables and FIGURE which are attached to this application.

In the following examples, except if otherwise stated, the cement brand is the standardized cement 42.5 R Gaurain (CEM) having a water demand of 24.2%, and the sand is Standardized sand under Standard EN 196-1 (SAN).

EXAMPLES

Example 1 Betocarb™ SL+UF+Product B

Enclosed is TABLE B showing the tests results.

TABLE B

| | A H2O | B Cement | C Betocarb HP-OG | D Betocarb SL | E Silica fume | F Meta-kaolin | G Etiquette violette | H Sand | I B | | J Chrysoflui Premia 196 | K Target | L Results | V-Funnel |
|---|---|---|---|---|---|---|---|---|---|---|---|---|---|---|
| | (g) | (g) | (g) | (g) | (g) | (g) | (g) | (g) | (g) | (% d/d) | (g) | (mm) | (mm) | (sec) |
| standard | 243 | 378 | 486 | 0 | 0 | 0 | 0 | 1350 | 0 | 0 | 3 | >350 | 465 | 5 |
| test 1a | 243 | 378 | 0 | 486 | 0 | 0 | 0 | 1350 | 1.2 | 0.1 | 3 | >350 | 425 | 7 |
| | | | | | | | | | 1.3 | 0.11 | | | 435 | |
| test 1b | 243 | 378 | 0 | 461 | 25 | 0 | 0 | 1350 | 1.2 | 0.1 | 3 | >350 | 401 | 8 |
| | | | | | | | | | 2.4 | 0.2 | | | 421 | |
| test 1c | 243 | 378 | 0 | 461 | 0 | 25 | 0 | 1350 | 1.2 | 0.1 | 3 | >350 | 415 | 8 |
| | | | | | | | | | 1.6 | 0.13 | | | 423 | |
| test 1d | 243 | 378 | 0 | 461 | 0 | 0 | 25 | 1350 | 0.6 | 0.05 | 3 | >350 | 400 | 7 |
| | | | | | | | | | 0.8 | 0.07 | | | 415 | |
| | | | | | | | | | 1.2 | 0.1 | | | 426 | |
| test 2a | 243 | 378 | 0 | 436 | 50 | 0 | 0 | 1350 | 3 | 0.25 | 3 | >350 | 423 | 9 |
| test 2b | 243 | 378 | 0 | 436 | 0 | 50 | 0 | 1350 | 0.8 | 0.07 | 3 | >350 | 0 | 9 |
| | | | | | | | | | 1.3 | 0.11 | | | 200 | |
| | | | | | | | | | 2.1 | 0.17 | | | 436 | |
| test 2c | 243 | 378 | 0 | 436 | 0 | 0 | 50 | 1350 | 0.6 | 0.05 | 3 | >350 | 425 | 6 |
| test 3a | 243 | 378 | 0 | 411 | 75 | 0 | 0 | 1350 | 3.6 | 0.3 | 3 | >350 | 420 | 12 |
| test 3b | 243 | 378 | 0 | 411 | 0 | 75 | 0 | 1350 | 2.6 | 0.21 | 3 | >350 | 415 | 10 |
| | | | | | | | | | 2.8 | 0.23 | | | 420 | |
| test 3c | 243 | 378 | 0 | 411 | 0 | 0 | 75 | 1350 | 0.6 | 0.05 | 3 | >350 | 420 | 6 |

Also enclosed is Table C showing a summary of the tests, and corresponding FIGURE.

TABLE C

| Trial | | Betocatb SL alone | | Betocatb SL + 5% Etiquette viol. | | Betocatb SL + 10% Etiquette viol. | | Betocatb SL + 15% Etiquette viol. | | Betocatb SL + 5% Silica fume | |
|---|---|---|---|---|---|---|---|---|---|---|---|
| No | Product | % B | mm | % B | mm | % B | mm | % B | mm | % B | mm |
| 2412/1 | Betocatb SL | 0.10 | 425 | 0.10 | 426 | 0.05 | 425 | 0.05 | 420 | 0.20 | 421 |

| Trial | | Betocatb SL + 10% Silica fume | | Betocatb SL + 15% Silica fume | | Betocatb SL + 5% Metakaolin | | Betocatb SL + 10% Metakaolin | | Betocatb SL + 15% Metakaolin | |
|---|---|---|---|---|---|---|---|---|---|---|---|
| No | Product | % B | mm | % B | mm | % B | mm | % B | mm | % B | mm |
| 2412/1 | Betocatb SL | 0.25 | 423 | 0.30 | 420 | 0.13 | 423 | 0.17 | 436 | 0.23 | 420 |

Betocarb SL is a "low" calcium carbonate based filler (marble) (d50=11-12 microns) (Blaine surface=365 m2/g)

Silica fume SF and metakaolin MK are two UFs as defined above.

Pulverized metakaolin (MK) is made by thermal treatment of natural clay. The crystalline clay minerals are dehydroxylated. Metakaolin powder has the higher pozzolanic activity (756 mg CaO/g sample). The calcining temperature of clay affects the pozzolanic reactivity of the resulting product.

Silica Fume (SF)

Silica fume originates from the reduction of high purity quartz with coal in electric arc furnaces in the production of silicon and ferrosilicon alloys and consists of very fine spherical particles containing at least 85% by mass of amorphous silicon dioxide.

EV (Etiquette Violette™) is an UF too as defined above, a very fine calcium carbonate from Omey, France, from microcrystalline Champagne Whiting.

For each group of tests, the UF amount is the same, that is respectively 25, 50 and 75 g.

Test 1a is a blank test (no UF)

The amount of mix water remains constant in all tests, 243 g. So is the amount of sand, 1350 g, and water 243 g.

The "standard" test is a comparative test with no UFs but with 486 g of BL 200 (d50=7 microns, Blaine=462 g/m2) serving as a reference for the cone diameter only (it is a low filler since it gives a poor flow and workability in the cone test).

Superplastifier B belongs to the preferred family as defined above.

Chrysofluid™ Premia 196 is a routine fluidifier and its amount remains constant at 3 g.

Table B shows that the low Filler Betocarb HP-OG provides an excellent result of 465 mm in cone test "galette" diameter (BUT as explained above, a poor flow and visual aspect).

When replacing the low filler Betocarb HP-OG with another low filler Betocarb SL at the same amount of 486 g (test 1a) one reaches 425 mm at 0.1% dry weight of superplastifier B or 435 mm at 0.11%.

These Tables B and C show the synergy between the treatment with UF and that by the superplastifier B.

Example 2 Betocarb SL+UF PCC or UF MCC+B

See Enclosed Table D

TABLE D

| | A<br>H2O | B<br>Cement | C<br>Betocarb<br>HP-OG | D<br>Betocarb<br>SL | E<br>PCC | F<br>MCC | G<br>Sand | H<br>B | I<br>B | Chrysofluid<br>Premia 196 | Target | Result | V-Funnel |
|---|---|---|---|---|---|---|---|---|---|---|---|---|---|
| Work 2/B | (g) | (g) | (g) | (g) | (g) | (g) | (g) | (g) | (% d/d) | (g) | (mm) | (mm) | (sec) |
| A1 | 243 | 378 | 486 | 0 | 0 | 0 | 1350 | 0 | 0 | 3 | >350 | 465 | 6 |
| A2 | 243 | 378 | 0 | 486 | 0 | 0 | 1350 | to adjust | to adjust | 3 | >350 | 435 | 7 |
| A3 | 243 | 378 | 0 | 461 | 25 | 0 | 1350 | to adjust | to adjust | 3 | >350 | 422 | 8 |
| A4 | 243 | 378 | 0 | 436 | 50 | 0 | 1350 | to adjust | to adjust | 3 | >350 | 426 | 9 |
| A5 | 243 | 378 | 0 | 386 | 75 | 0 | 1350 | to adjust | to adjust | 3 | >350 | 420 | 10 |
| A6 | 243 | 378 | 0 | 461 | 0 | 25 | 1350 | to adjust | to adjust | 3 | >350 | 400 | 8 |
| A7 | 243 | 378 | 0 | 436 | 0 | 50 | 1350 | to adjust | to adjust | 3 | >350 | 410 | 10 |
| A8 | 243 | 378 | 0 | 386 | 0 | 75 | 1350 | to adjust | to adjust | 3 | >350 | 385 | 11 |

This test is the same as above Example 2 except that as UF one uses a precipitated calcium carbonate PCC d50=1.52 microns, known to be an UF, or a MCC which is a modified calcium carbonate (see U.S. Pat. No. 6,666,953) d50=2.29 microns.

Results call for the same comments as in Example 2.

Example 3 Lavigne+Product A (Comparative Test)

Enclosed is Table E

TABLE E

| | | A | B | C | D |
|---|---|---|---|---|---|
| | Reference sample | 2252/1 | 2252/1 | 2252/1 | 2252/1 |
| | Reference | Lavigne 13µ | Lavigne 13µ + 0.05% A | Lavigne 13µ + 0.1% A | Lavigne 13µ + EV |
| | Cement | 378 | 378 | 378 | 378 |
| | H2O | 243 | 243 | 243 | 243 |
| | Sand | 1350 | 1350 | 1350 | 1350 |
| | Filler | St Béat | St Béat | St Béat | St Béat/Violette |
| | CaCO3 | 486 | 486 | 486 | 436/50 |
| | % A (Sec/sec) | 0 | 0.05 | 0.1 | 0 |
| Test 4g | Fluidifier Premia 196 | 4 | 4 | 4 | 4 |
| | Consistancy (>350 mm) | 413 | 428 | 441 | 440 |
| | Aspect | A2 | A2 | A2 | A2 |
| Observations | | Slow flow –<br>Dilating mortar | Slow flow –<br>Dilating mortar | Slow flow –<br>Dilating mortar | Fluid mortar +<br>somewhat settles |

The low filler is Lavigne, a coarse carbonate, marble, d50=13 microns.

The UF used to treat the above filler is Etiquette violette EV d50=2.4 microns.

If we consider the lefthand column A (Lavigne Filler with no UF treatment and no treatment with a superplastifier) we can see that the diameter in the cone test is 413 mm.

Despite the very good value of 413 mm for the diameter of the cone test, the slurry is flowing only slowly and is "dilating"; the overall result is therefore mitigated since the cone diameter is excellent but the flow test could be better in visual "aspect".

Another test has been performed (not shown in the Table) with 3 g of fluidifier instead of 4 g: in that case, the mortar becomes "fluid".

This means that the right optimum in this test is to use the indicated proportion of EV but between 3 and 4 g of fluidifier, −3.7 g, preferably 3.5 g.

If we consider the two central columns, B and C, we can see that by treating the marble with resp. 0.005% or 0.10% Product A/dry weight of cement composition one obtains the same "low flow rate" and "dilating mortar" but with a better diameter.

This shows that the treatment of the considered marble with 0.05 to 0.10% Product A improves the workability of the mortar composition, but for this marble type, not enough.

Below 0.05%, no pertinent measurement of the precise % can be done in Laboratory conditions, so we can see or deduct from the table E that a treatment of this marble with about 0.03 to 0.05-0.10-0.15% Product B improves clearly the diameter but not the flow rate.

If we consider now the next column D one can see that by replacing 486 g of Lavigne filler with 436 g of the same Lavigne filler but treated only with 50 g of EV according to the invention, with still 4 g of fluidifier Chrysofluid Premia 196 being present as above, the cement composition becomes fluid with a very high diameter of 440 mm (same as the 441 mm obtained with a treatment with only 1% of Product A) with the only disadvantage that it somewhat settles.

Here again, an adjustment of the fluidifier at 3 g instead of 4 g renders the mortar "fluid".

So, here again, the optimum is a treatment in the presence of between 3 and 4 g of fluidifier, such as 3.4-3.7 g, preferably 3.5 g/dry weight of the total cement composition.

We can conclude from this table E that the treatment with Product A superplastifier alone does not bring, for this specific marble, a solution which is entirely satisfactory. The treatment with only an UF brings a satisfactory solution at 3-3.5 g fluidifier (it is the subject matter of a pending application filed the same day as the present one).

This test confirms the interest of treating the coarse filler first with an UF then treating the preblend with a superplastifier to take benefit from the synergy.

Application(S)

The applications are all those commonly using the above described cement, mortar, or concrete compositions or systems.

Cement Products

Those are the products or elements that are known to be manufactured from the above cement, mortar or concrete compositions, in the building industry or any other industry, in a well-known manner.

The invention claimed is:

1. A process for preparing a cement composition comprising introducing during the manufacture of a cement composition as a filler a blend of a coarse calcium carbonate—comprising filler and an ultrafine filler, wherein the blend is treated with at least one treating agent comprising at least one superplastifier before being introduced into the cement composition, wherein the coarse calcium-carbonate comprising filler has a $d_{50}$>6 microns, and the ultrafine filler has a $d_{50}$ from 1 to 6 microns and a Blaine of greater than 1000 $m^2/kg$, and wherein the cement composition so prepared comprises cement, said blend treated with said treating agent as a filler, optionally aggregates selected from the group consisting of sand and gravel, and optionally one or more additives.

2. The process according to claim 1, wherein the coarse calcium carbonate—comprising filler is ground natural calcium carbonate, precipitated calcium carbonate, modified calcium carbonate, or any mixture thereof.

3. The process according to claim 1, wherein the coarse calcium carbonate—comprising filler is a mixture of ground natural calcium carbonate and precipitated calcium carbonate at a ratio of 30/70 to 70/30% by dry weight.

4. The process according to claim 1, wherein the coarse calcium carbonate—comprising filler is selected from the group consisting of (i) calcium carbonate having a $d_{50}$ of 7 to 9 microns and a Blaine of 462 to 690 $m^2/g$, (ii) calcium carbonate having $d_{50}$ of 10.4 to 10.8, and (iii) calcium carbonate having a $d_{50}$ of 18 microns and a Blaine of about 365 $m^2/g$.

5. The process according to claim 1, wherein the ultrafine filler has a $d_{50}$ from 1 to 5 microns and a Blaine of greater than 1000 $m^2/kg$ and of less than 2000 $m^2/kg$.

6. The process according to claim 1, wherein the ultrafine filler has a $d_{50}$ from 1 to 3 microns and a Blaine of greater than 1000 $m^2/kg$ and of less than 2000 $m^2/kg$.

7. The process according to claim 1, wherein the ultrafine filler has a $d_{50}$ from 2 to 3 microns and a Blaine of greater than 1000 $m^2/kg$ and of less than 2000 $m^2/kg$.

8. The process according to claim 1, wherein the ultrafine filler has a $d_{50}$ of less than <5 microns and a Blaine of greater than 1000 $m^2/kg$ and of less than 2000 $m^2/kg$.

9. The process according to claim 1, wherein the ultrafine filler has a $d_{50}$ from 1 to 5 microns and a Blaine of greater than 1500 $m^2/kg$.

10. The process according to claim 1, wherein the ultrafine filler is selected from the group consisting of: (i) a silica fume having a $d_{50}$ of 1 to 2 microns, (ii) metakaolin having a $d_{50}$ of 3 to 5 microns, (iii) metakaolin having a $d_{50}$ of 3 to 6 microns, a chalk having a $d_{50}$ of 1 to 5 microns, (iv) a calcite having a $d_{50}$ of about 1 micron; (v) white limestone having a $d_{50}$ of about 2 microns, (vi) a marble having a $d_{50}$ of 1 to 6 microns, (vii) a marble having a $d_{50}$ of 1 to 5 microns, (viii) ultrafine calcium carbonate having a $d_{50}$ of 1-2 microns, (ix) ultrafine calcium carbonate from microcrystalline whiting having a $d_{50}$ of about 2.4 micron, (x) an ultrafine siliceous product having a $d_{50}$ of about 1.86 microns, (xi) modified calcium carbonate having a $d_{50}$ of about 2.29 microns, and (xii) precipitated calcium carbonate having a $d_{50}$ of about 1.52 microns.

11. The process according to claim 1, wherein the ultrafine filler is selected from the group consisting of: (i) ultrafine calcium carbonate having a $d_{50}$ of about 2.4 microns, (ii) silica fume, (iii) metakaolin, and (iv) ultrafine calcium carbonate having a $d_{50}$ of 1 to 2 microns.

12. The process according to according to 1, wherein superplastifier is a polycarboxylate, a polycarboxylate ether, or a product manufactured from sulfonated naphthalene condensate or sulfonated melamine formaldehyde.

13. The process according to claim 1, wherein the superplastifier is a polycarboxylate ether.

14. The process according to claim 1, wherein the superplastifier is present in an amount of from 0.3 to 3 kg for 100 kg of the cement composition, on a dry to dry basis.

15. The process according to claim 1, wherein the superplastifier is present in an amount of from 0.3 to 2 kg for 100 kg of the cement composition, on a dry to dry basis.

16. The process according to claim 1, wherein the superplastifier is present in an amount of from 0.8 to 1.23 kg for 100 kg of the cement composition, on a dry to dry basis.

17. The process according to claim 1, wherein the superplastifier is present in an amount of from 0.05 to 0.1% per dry weight based on the dry weight of the coarse calcium carbonate—comprising filler.

18. The process according to claim 1, wherein the at least one treating agent comprises a superplastifier only, or a superplastifier and a plasticizer.

19. The process according to claim 1, wherein the at least one treating agent comprises a superplastifier and a plasticizer in a ratio of from 95/5 to 85/15 on a dry weight basis.

20. The process according to claim 1, wherein the cement composition further comprises a fluidifier.

21. The process according to claim 20, wherein the fluidifier is a modified polycarboxylate.

22. The process according to claim 20, wherein the fluidifier is present in an amount from 3 to 4 g per dry weight of the total cement composition.

23. The process according to claim 1, wherein the cement composition comprises one or more of a setting accelerator, a setting retarder and an air entrainment agent as additives.

24. The process according to claim 1, wherein the coarse calcium carbonate—comprising filler is dry calcium carbonate, the at least one treating agent is a superplastifier, and the cement composition further comprises one or more additives, and optionally aggregates selected from the group consisting of sand and gravel.

25. The process according to claim 1, wherein the coarse calcium carbonate—comprising filler is dry calcium carbonate, the at least one treating agent is a superplastifier, and the cement composition further comprises one or more additives, water and optionally aggregates selected from the group consisting of sand and gravel.

* * * * *